(12) United States Patent
Ware et al.

(10) Patent No.: US 10,705,989 B2
(45) Date of Patent: Jul. 7, 2020

(54) PROTOCOL INCLUDING TIMING CALIBRATION BETWEEN MEMORY REQUEST AND DATA TRANSFER

(71) Applicant: Rambus Inc., Sunnyvale, CA (US)

(72) Inventors: Frederick A. Ware, Los Altos Hills, CA (US); Holden Jessup, Palo Alto, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 15/864,732

(22) Filed: Jan. 8, 2018

(65) Prior Publication Data

US 2018/0181505 A1 Jun. 28, 2018

Related U.S. Application Data

(63) Continuation of application No. 13/143,760, filed as application No. PCT/US2010/020135 on Jan. 5, 2010.

(60) Provisional application No. 61/144,331, filed on Jan. 13, 2009.

(51) Int. Cl.
*G06F 13/16* (2006.01)

(52) U.S. Cl.
CPC .................. *G06F 13/1689* (2013.01)

(58) Field of Classification Search
CPC ... G10L 19/008; G06F 13/40; G06F 13/4234; G06F 13/1689; G06F 1/06; G06F 1/08; G06F 1/14; G06F 3/0611; G07C 9/00182
See application file for complete search history.

(56) References Cited

U.S. PATENT DOCUMENTS

| | | | |
|---|---|---|---|
| 6,646,953 B1 * | 11/2003 | Stark | G06F 13/4217 365/189.12 |
| 6,788,594 B2 | 9/2004 | Ware et al. | |
| 8,046,541 B1 * | 10/2011 | Dolev | G06F 13/1694 711/154 |
| 2001/0047450 A1 * | 11/2001 | Gillingham | G06F 13/1689 711/105 |
| 2004/0054845 A1 * | 3/2004 | Ware | G06F 13/1684 711/100 |
| 2005/0069071 A1 * | 3/2005 | Kim | H03L 7/0814 375/355 |
| 2005/0132158 A1 | 6/2005 | Hampel et al. | |

(Continued)

OTHER PUBLICATIONS

US 6,600,682 B2, 07/2003, Ware et al. (withdrawn)

(Continued)

*Primary Examiner* — Yong J Choe
(74) *Attorney, Agent, or Firm* — Lance Kreisman; Peninsula Patent Group

(57) ABSTRACT

The described embodiments provide a system for controlling an integrated circuit memory device by a memory controller. During operation, the system sends a memory-access request from the memory controller to the memory device using a first link. After sending the memory-access request, the memory controller sends to the memory device a command that specifies performing a timing-calibration operation for a second link. The system subsequently transfers data associated with the memory-access request using the second link, wherein the timing-calibration operation occurs between sending the memory-access request and transferring the data associated with the memory-access request.

20 Claims, 18 Drawing Sheets

(56) References Cited

U.S. PATENT DOCUMENTS

| | | | |
|---|---|---|---|
| 2006/0117155 A1* | 6/2006 | Ware | G11C 7/1006 |
| | | | 711/163 |
| 2007/0170909 A1* | 7/2007 | Vorenkamp | G06F 1/266 |
| | | | 324/76.11 |
| 2007/0217559 A1 | 9/2007 | Stott et al. | |
| 2007/0252735 A1 | 11/2007 | Shi et al. | |
| 2008/0028123 A1* | 1/2008 | Bartley | G06F 13/4243 |
| | | | 711/5 |
| 2008/0168298 A1 | 7/2008 | Bellows et al. | |

OTHER PUBLICATIONS

PCT International Search Report and Written Opinion dated Aug. 23, 2010 re International Application No. PCT/US10/020135. 7 pages.

* cited by examiner

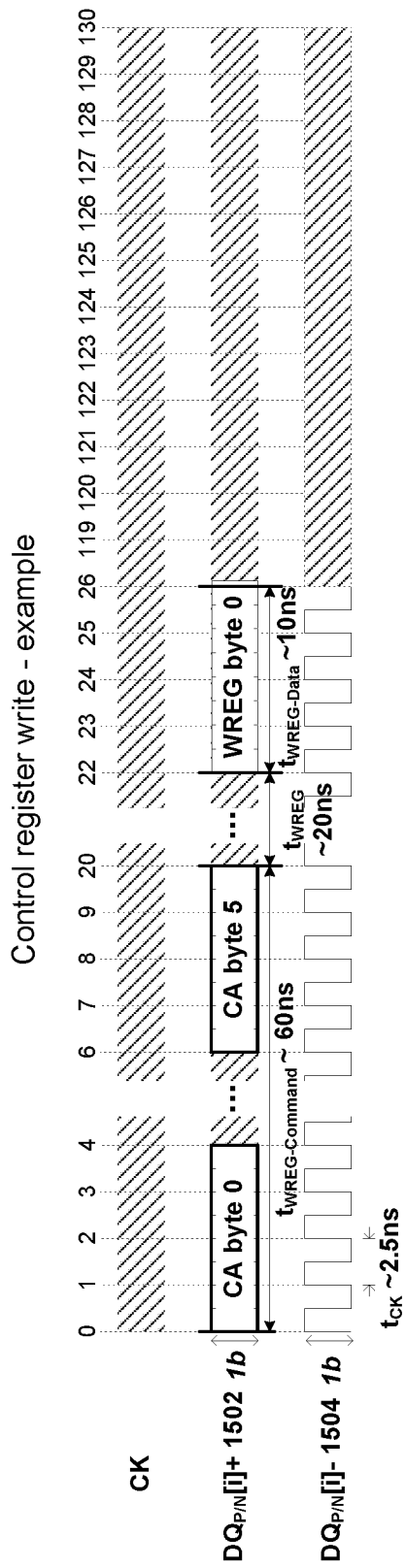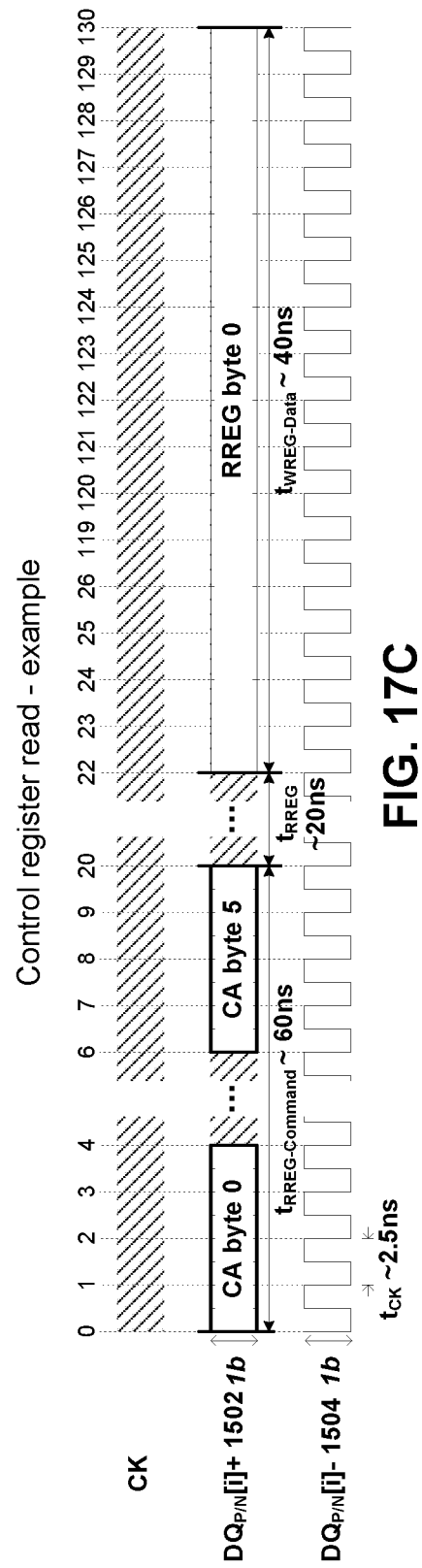

PROTOCOL INCLUDING TIMING CALIBRATION BETWEEN MEMORY REQUEST AND DATA TRANSFER

CROSS-REFERENCE TO RELATED APPLICATIONS/TECHNICAL FIELD

This application is a Continuation of U.S. Ser. No. 13/143,760, filed Jul. 8, 2011, entitled "PROTOCOL INCLUDING TIMING CALIBRATION BETWEEN MEMORY REQUEST AND DATA TRANSFER", which claims priority from International Application No. PCT/US2010/020135, published as WO 2010/083073 on Jul. 22, 2010, which claims priority from U.S. Provisional Application No. 61/144,331, filed Jan. 13, 2009 and entitled "MEMORY SYSTEM USING ASYMMETRIC SOURCE-SYNCHRONOUS CLOCKING". U.S. application Ser. No. 13/143,760, International Application No. PCT/US2010/083073 and U.S. Provisional Application No. 61/144,331 are hereby incorporated by reference in their entirety. The present embodiments generally relate to the design of a memory system. More specifically, the present embodiments relate to systems, methods and circuits for communicating between a memory controller and one or more memory devices.

BACKGROUND

Related Art

Non-volatile flash memory has become a viable next-generation replacement for disk drives in computer systems. Such solid-state semiconductor memory has a number of advantages relative to the rotating magnetic storage used in disk drives, including reliability, faster access times and lower power consumption. In contemporary non-volatile memory architectures that require large capacity, each memory device communicates with a memory controller through a large number of communication links which carry command, address, and data information. However, providing such a large number of links with high bandwidth to a large number of non-volatile memory devices results in a memory system which is complicated, expensive and incompatible with, for example, modern Flash memory core and interface attributes.

BRIEF DESCRIPTION OF THE FIGURES

FIG. 17B illustrates a timing diagram for a control-register-write transaction.

FIG. 17C illustrates a timing diagram for a control-register-read transaction.

DETAILED DESCRIPTION

The disclosed embodiments demonstrate a relatively simple and low-cost system for communicating between a memory controller and a large number of solid-state semiconductor memory devices. A protocol in an embodiment which facilitates high bandwidth data transfers to a large number of devices begins with a request for the memory access from a memory controller to a memory device. The system then performs a timing-calibration operation for a data transfer between the memory controller and the memory device before performing the data transfer.

Figure 1:
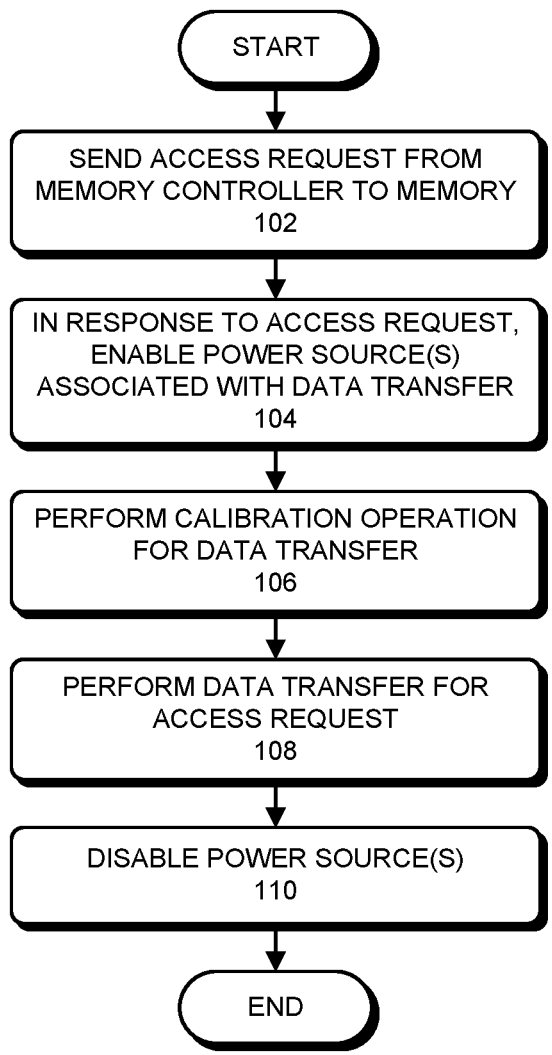
FIG. 1 presents a flow chart illustrating how a memory system processes a memory access request.

More specifically, referring to the flow chart illustrated in FIG. 1, the system first sends a memory access request from a memory controller to a non-volatile memory device (step 102), such as a flash memory. The memory controller may send the memory request to the memory device via a shared, multi-drop communication link with a high-swing voltage as described in more detail below. This shared link is referred to as a "command-address" (CA) link.

In response to this access request, one or more power sources on the memory device are enabled. These power sources are associated with a faster, point-to-point data link with a low-swing voltage (step 104). Next, the system/memory device/controller performs a calibration operation for the data link (step 106). This calibration operation can involve: (1) calibrating a phase relationship between a timing reference and a data signal on the data link; and/or (2) locking a "locked loop," which provides a timing reference for communications on the data link. This locked loop can include any one of a number of loop circuits which are used to provide a timing reference, such as a phase-locked loop (PLL) or a delay-locked loop (DLL).

After the data link is initialized and calibrated, data associated with the access request is transmitted across the data link (step 108). For example, for a read operation, the data is transported from the memory device to the memory controller, whereas for a write operation the data is transported from the memory controller to the memory device.

Finally, after the requested memory access is complete, the one or more power sources which were enabled in step 104 are disabled in step 110. In implementations which, for example, desire low power consumption, it is advantageous to disable the one or more power sources associated with the data link because the data link only services a single memory device and the memory device may not be accessed again for a long period of time, while other memory devices (which are associated with other data links) are being accessed.

Voltage-Swing Differentiated Command/Data Interface

Figure 2:
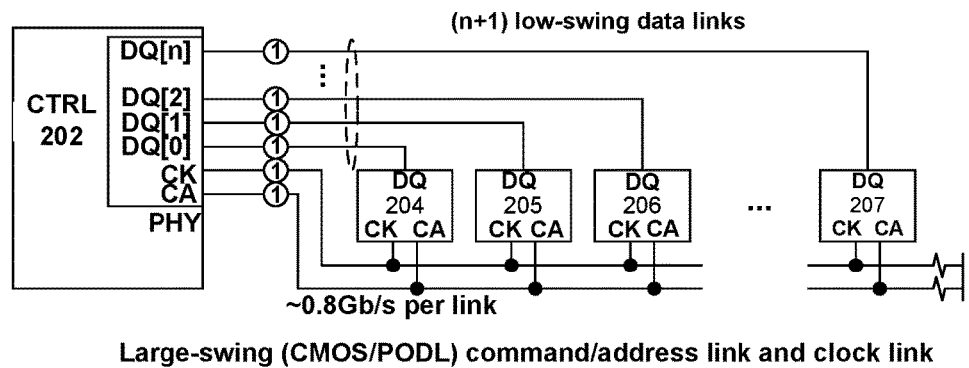
FIG. 2 illustrates an embodiment for a memory system with a shared, large-swing command/address link and multiple point-to-point low-swing data links.

A block diagram for an embodiment of a system using voltage swing differentiated command/data transfer appears in FIG. 2. Here a memory controller (CTLR) 202 is coupled to a number of flash memory devices 204-207. During a memory access, this memory system includes a shared, large-swing link between the memory controller and the non-volatile memory devices to trigger initialization and calibration operations for a faster, low-swing, point-to-point link, which is used to transfer a block of data between the memory controller and a single memory device. More specifically, memory controller 202 communicates with flash memory devices 204-207 through a single shared CA link and a single shared clock (CK) link. This CA link can be a single-ended, multi-drop serial link which couples a memory controller (CTRL) to multiple non-volatile memory devices. Moreover, memory controller 202 is coupled to each of the flash memory devices 204-207 through a single dedicated point-to point data link. Because this architecture uses only a small number of interconnections, it lends itself to a very simple and cost-effective implementation. Throughout this description, the terms "Flash" and "non-volatile" may appear interchangeably and are subclasses of memory devices cited as exemplary memory device embodiments.

Figure 3:
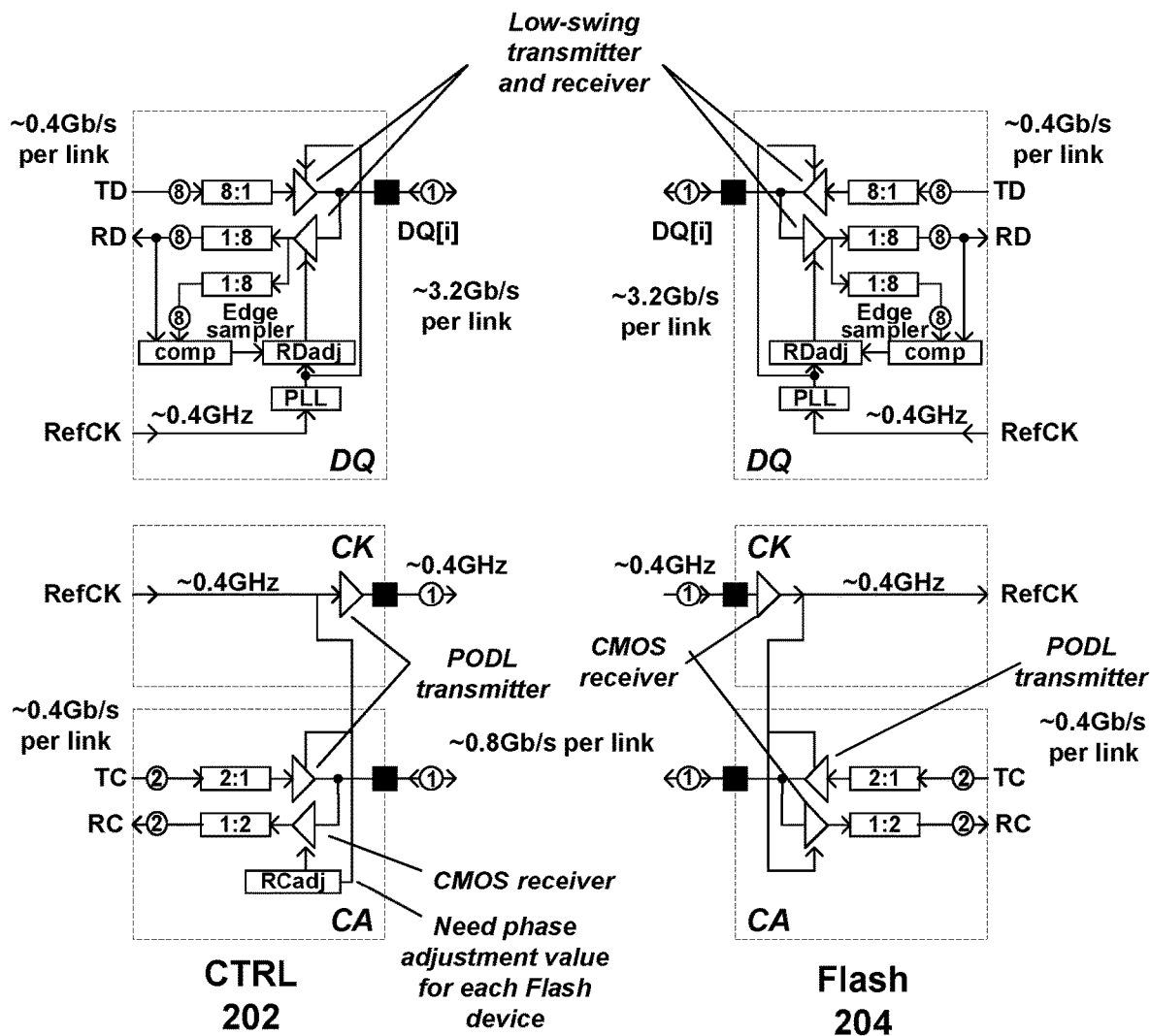
FIG. 3 illustrates corresponding interface circuitry within the controller and flash memory device.

FIG. 3 illustrates an embodiment of associated interface circuitry within the memory controller (CTRL) 202 and flash memory device (FLASH) 204. This interface circuitry includes transmitters and receivers for a high-performance, low-swing DQ link between memory controller 202 and flash memory device 204. In this embodiment, this DQ circuitry includes a PLL at the memory controller 202 and a PLL at the flash memory device 204, which each generate a clock signal for a ~3.2 Gb/s link based on a slower ~0.4 GHz reference clock. (The bandwidth parameters used in the exemplary implementations in this disclosure, such as ~3.2 Gb/s, are specific examples based on projections for future bandwidths for flash memory devices. These parameters are not meant to limit the disclosed embodiments.)

The DQ circuitry additionally includes a number of 8:1 serializers which prepare the data for transmission over the serial DQ link by multiplexing a parallel set of 8 data bits to a single bit serial data stream for output by a transmitter. Data output from the transmitter is launched synchronously with respect to rising and falling edges of a clock signal such that two bits are transmitted per clock cycle for each single bit serial stream. In addition, the DQ circuitry includes a number of corresponding 1:8 de-serializers, which convert incoming single bit wide serial data from the DQ link into 8-bit parallel data. The serialization ratio of 8-to-1 in these circuits is merely exemplary. Hence, other embodiments can use other serialization ratios, such as 4-to-1 or 16-to-1.

The DQ circuitry also includes circuitry which uses phase-adjustment values to calibrate the timing for the communications across the ~3.2 Gb/s link, as well as comparators which are used during the calibration process. This calibration process can involve "shmooing" or any other existing or future technique for calibrating the timing of data relative to a timing reference signal during a memory operation. For example, in some embodiments, this calibration involves adjusting a sampling clock on a receiver to sample a center of a data eye of the data signal, or alternatively, phase-shifting the launch of the data at the transmitter such that the data is sampled at the receiver in the middle of the data eye. After the received data is sampled with a phase-adjusted clock signal, the comparators are used to compare sampled data with the original test pattern to determine the boundaries of the data eye. The above-described operations can take place with transmitters and/or receivers located at either the memory controller or the memory device.

Moreover, the timing-calibration operation can involves multiple phase comparisons at different phase offsets which vary by at least one transmit bit (tBIT) time, wherein a tBIT time is the period of time that defines a valid single bit of data and a transmit tBIT time is the time required for a transmitter circuit to transmit a single bit of data onto an external signal line. Hence, the phase-adjustment for the timing calibration operation can possibly be larger than a transmit bit time, which means that the calibration technique needs to account for the fact that the phase-adjustment may need to be larger than one tBIT time.

The interface circuitry also includes a transmitter on memory controller 202 and a receiver on flash memory device 204 for the ~0.4 GHz reference clock signal, which is transmitted from memory controller 202 to flash memory device 204.

The interface circuitry additionally includes transmitters and receivers for a low-performance, large-swing CA link between memory controller 202 and flash memory device 204. The CA circuitry in memory controller 202 includes a separate phase-adjustment value for each flash memory device, which enables the CA link to provide a different calibration for each individual flash memory device.

Figure 4:
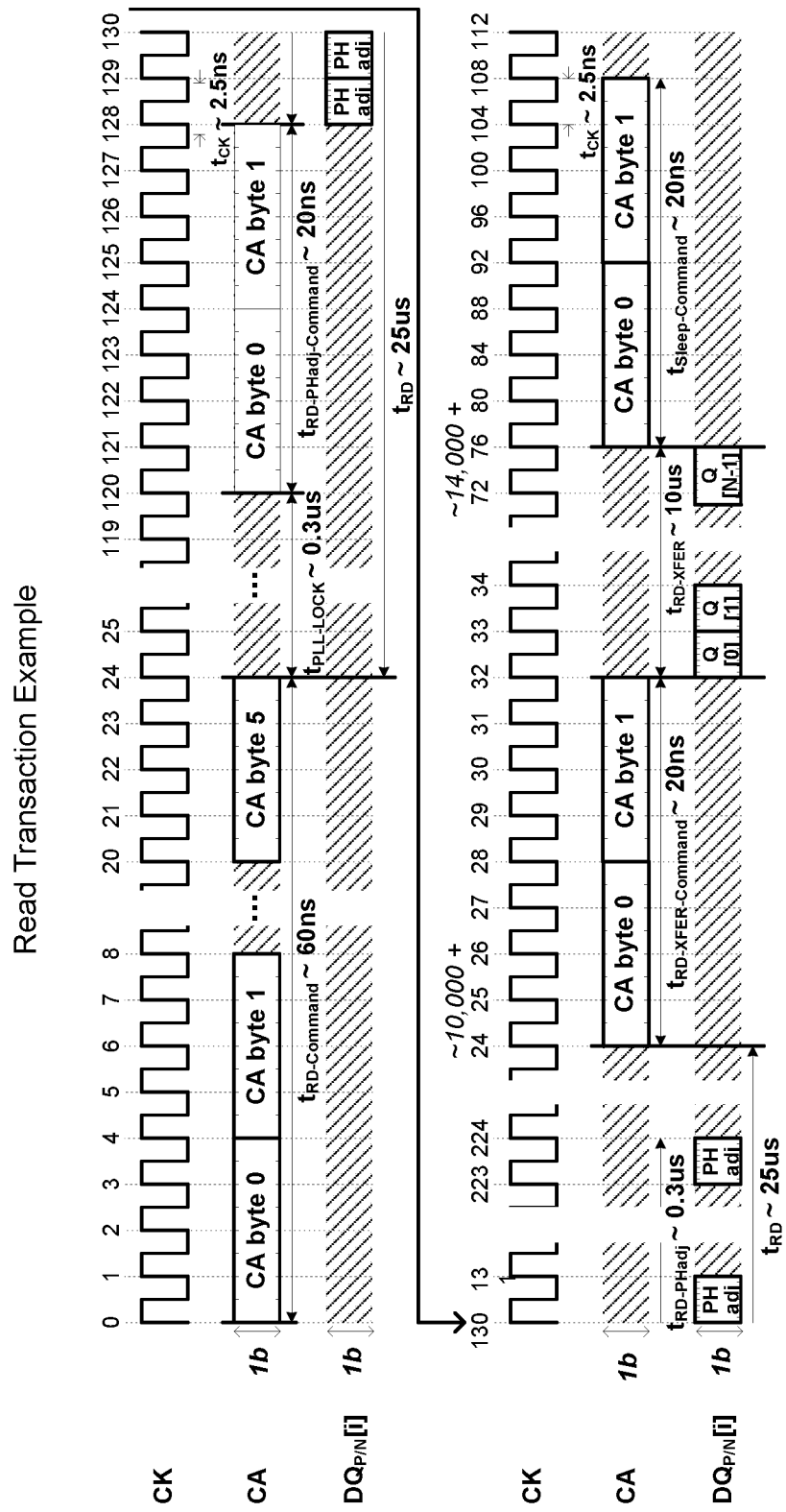
FIG. 4 illustrates a timing diagram for a read transaction.

FIG. 4 presents a timing diagram for an exemplary read transaction for the system illustrated in FIG. 2. As can be seen from FIG. 4, the read transaction starts when memory controller 202 sends a six-byte read command on the CA link, which, in this example, requires about 60 ns. Next, the system takes about 0.3 μs to lock one or more PLLs located on memory controller 202 and/or flash memory device 204. At the same time, the system can enable one or more power sources associated with the high-speed DQ link (not shown in FIG. 4). These enabled power sources can exist both on the memory controller and the memory device. Moreover, the enabled power sources can include, but are not limited to a power source for: (1) a phase-locked loop (PLL) or a delay-locked loop (DLL); (2) a transmitter for the data link; (3) equalization circuitry associated with the data link; (4) a digital-to-analog (D/A) converter associated with communications across the data link; (5) an analog-to-digital (A/D) converter associated with communications across the second link; (6) a differential pair which comprises a communication channel for the data link; and (7) clocking circuitry in a clock tree for the memory device.

After the PLLs are locked, memory controller 202 sends a two-byte command to perform a phase-adjustment operation to flash memory device 204. For example, this phase-adjustment operation can involve sending one or more test data patterns from flash memory device 204 to memory controller 202 across the DQ link. In general, this phase-adjustment operation involves calibrating a phase relationship between a timing reference and an associated data signal. Moreover, this phase-adjustment operation can take place at any time during the 25 μs which is required to access the read data in flash memory device 204. Additionally, the phase-adjustment operation can involve a calibration in which an adjustable transmit or receive phase is created by adjusting a phase-interpolator structure. This allows one of a set of clock signals (typically four to eight) which are evenly spaced across the 360 degrees of one clock cycle to be selected to provide a coarse phase adjustment, and an interpolated phase value to be created from a pair of these adjacent clock phases to provide a fine phase adjustment.

After the phase-adjustment operation is complete and the read data is retrieved from within flash memory device, memory controller 202 sends a two-byte data-transfer command across the CA link, and a 4096-byte block data transfer subsequently takes place from memory device 204 to memory controller 202 across the DQ link, which requires about 10 μs.

Finally, at the end of this block data transfer, memory controller 202 sends a two-byte sleep command across the CA link, which causes the power sources associated with the DQ link to be disabled.

Figure 5:
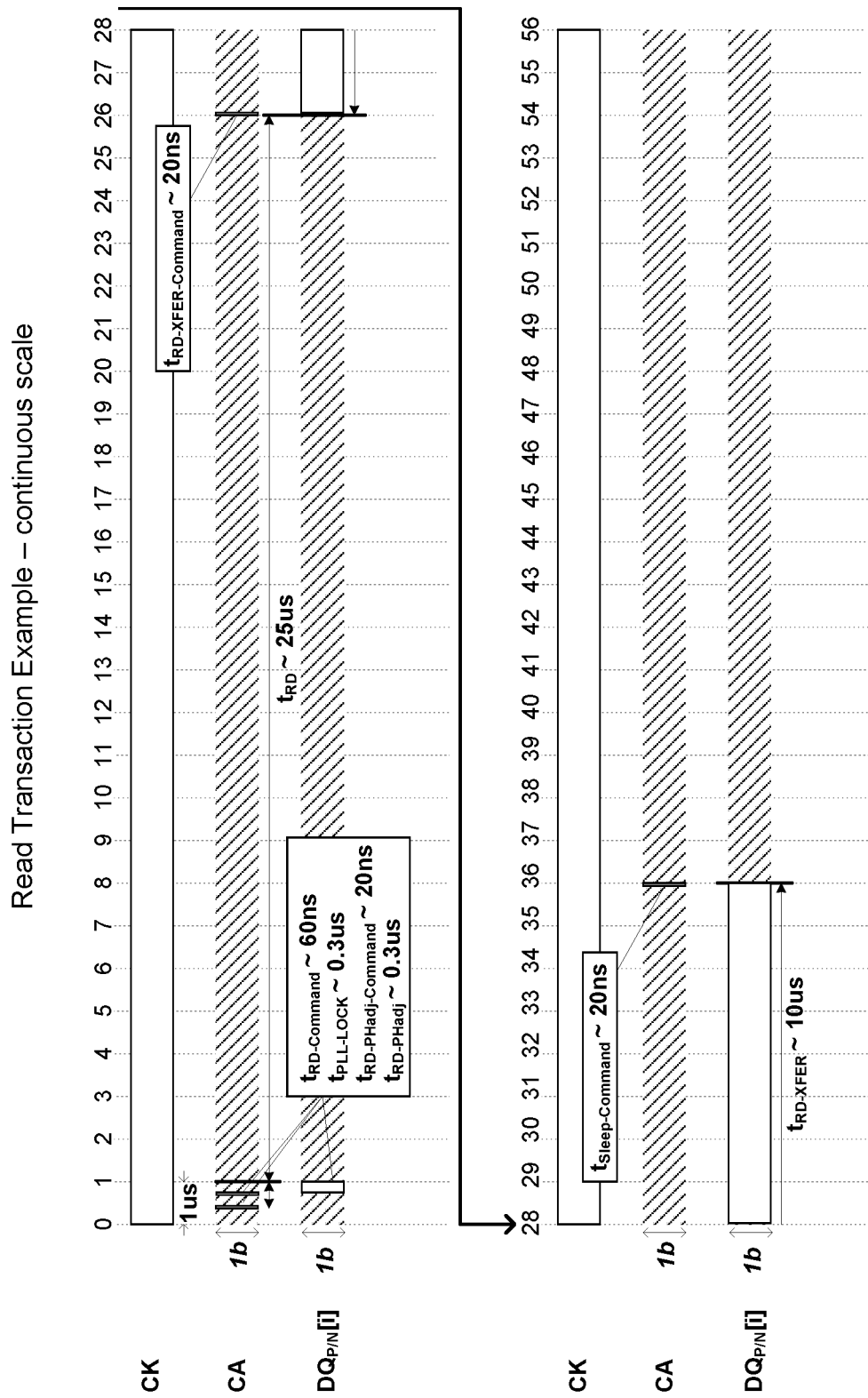
FIG. 5 illustrates a timing diagram for the read transaction with a continuous time scale.

FIG. 5 illustrates the same exemplary read transaction on a continuous time scale. From this figure it is evident that, for this embodiment, it takes a long time (about 25 μs) for the read data to be retrieved internally within the flash memory device 204. It also takes a significant amount of time (about 10 μs) for the 4096-bytes of read data to be transferred across the DQ link. Also, the traffic on the CA link for this read transaction is relatively sparse, which means that the single, shared CA link has sufficient capacity to perform memory operations for a large number of memory devices.

Figure 6:
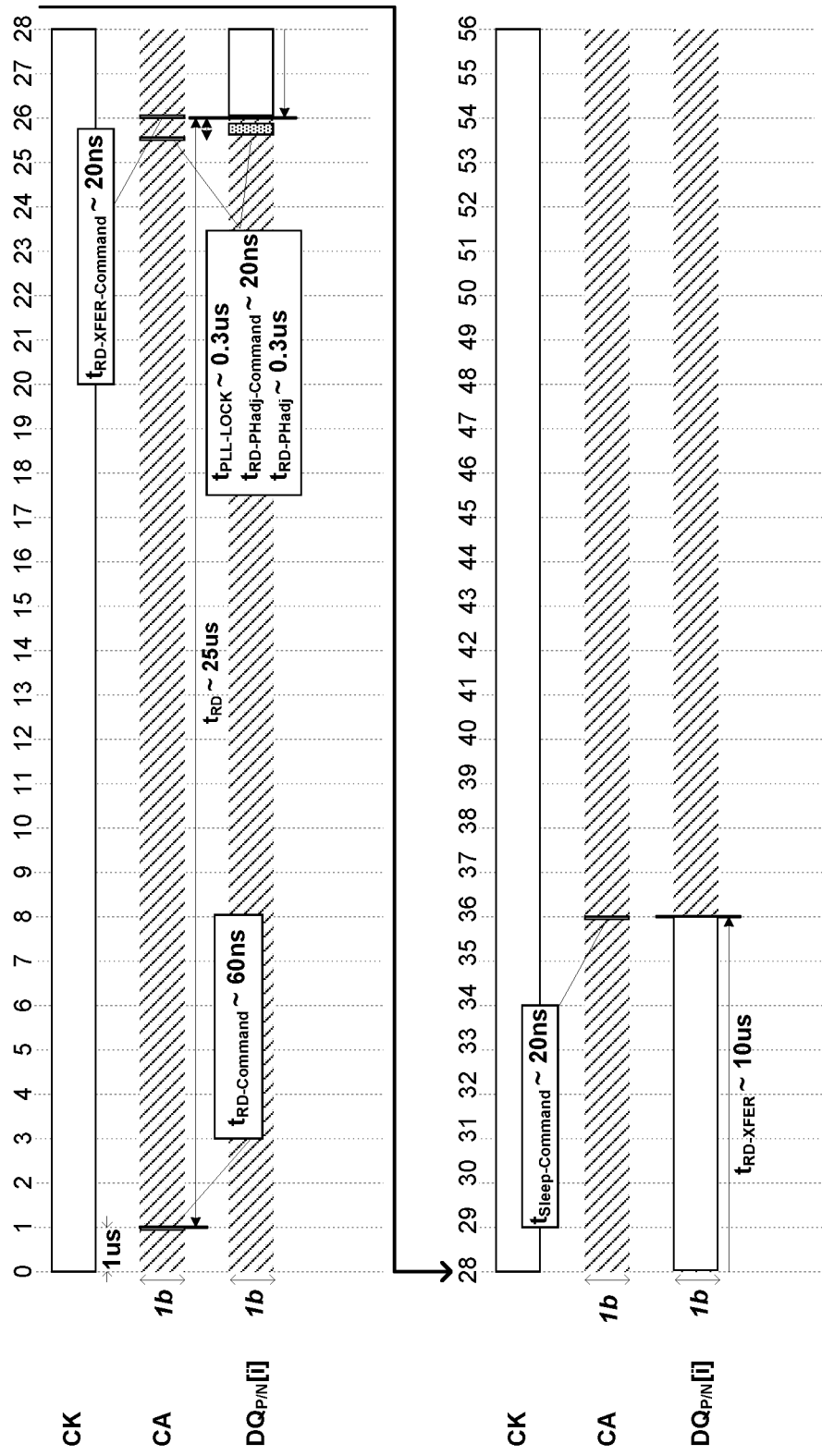
FIG. 6 illustrates a timing diagram for a read transaction with an alternative phase-adjustment sequence.

FIG. 6 presents a timing diagram for a read transaction with an alternative phase-adjustment sequence. In this alternative sequence, the PLL locking and the phase adjustment operations take place near the end of the 25 μs interval required to retrieve the read data internally within the flash memory device (instead of before the 25 μs interval starts).

Figure 7A:
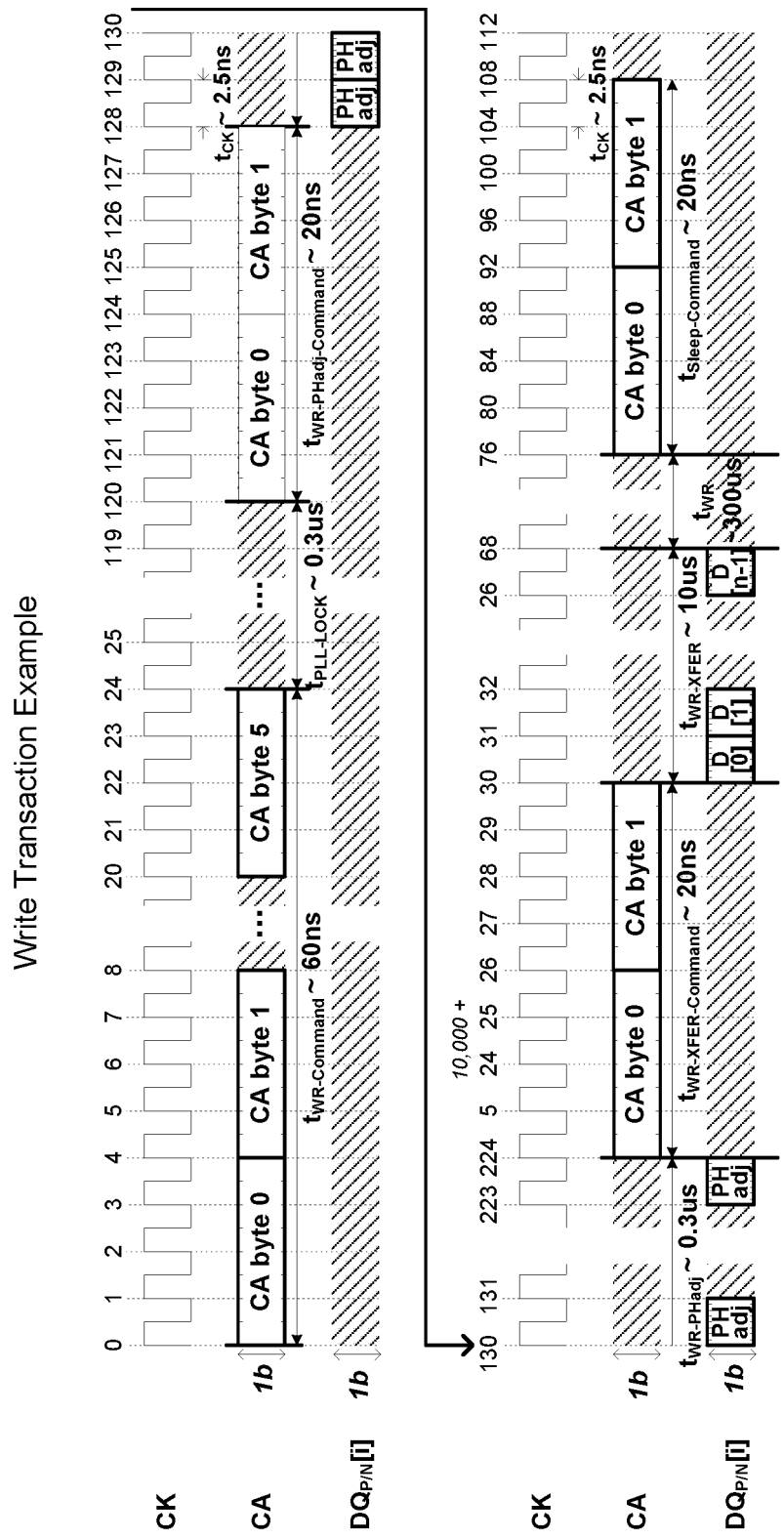
FIG. 7A illustrates a timing diagram for a write transaction.

FIG. 7A presents a timing diagram for an exemplary write transaction for the system illustrated in FIG. 2. As can be seen from FIG. 7A, the write transaction starts when memory controller 202 sends a (e.g., six-byte) write command on the CA link, which requires about 60 ns. This six-byte (48-bit) command is transferred serially across the CA link and is deserialized inside the memory component and interpreted. The six-byte format is merely presented as an example. Four bytes and six bytes are common command lengths for many current flash products. Six bytes provides 48 bits for a command opcode, an address, and other information. It is possible the command format might increase in the future (to eight bytes, for example), as storage capacity continues to increase or as other information fields are added.

Although six-bytes is a useful exemplary size for a write command (assuming typical encoding and addressing requirements for memory operations), the disclosed embodiments are not meant to be limited to commands, addresses or data transfers that have specific sizes. The optimal sizes for these items will vary between systems based on various system parameters, such as the ratio between the access time to the memory core and the available interface bandwidth.

Next, the system takes about 0.3 μs to lock one or more PLLs located on memory controller 202 and/or flash memory device 204. At the same time, the system can enable one or more power sources associated with the high-speed DQ link (not shown in FIG. 7A).

After the PLLs are locked, memory controller 202 sends a two-byte command to perform a phase-adjustment operation to flash memory device 204. This phase-adjustment operation involves sending one or more data patterns from flash memory device 204 to memory controller 202 across the DQ link.

After the phase-adjustment operation is complete, memory controller 202 sends a two-byte data transfer command across the CA link, and a 4096-byte block data transfer subsequently takes place from the memory controller to the flash memory device across the DQ link, which requires about 10 μs. Two bytes (16 bits) is estimated to be the shortest practical command length for simple operations, such as scheduling a data transfer or placing a device into a specific power state. The 16 bits can contain an opcode and a device address (remember that the CA link is shared by a number of memory devices). The 10-12 bytes of information required for a complete transaction takes only about 100 ns of time to be transferred across the shared CA link, meaning that dozens of memory devices could potentially be controlled though the single, shared CA link.

Next, it takes about 300 μs to write the data internally within the flash memory device, during which time the DQ link and the CA link are not performing any operations related to the write transaction.

Finally, after the data is written internally within the flash memory device, memory controller 202 sends a two-byte sleep command across the CA link, which causes the power sources associated with the DQ link to be disabled. The power sources which are disabled can include, but are not limited to, power sources for: (1) a phase-locked loop (PLL) or a delay-locked loop (DLL); (2) a transmitter for the data link; (3) equalization circuitry associated with the data link; (4) a digital-to-analog (D/A) converter associated with communications across the data link; (5) an analog-to-digital (A/D) converter associated with communications across the second link; (6) a differential pair which comprises a communication channel for the data link; and (7) clocking circuitry in a clock tree for the memory device. In one embodiment, a sleep command is directed to an individual memory component on the CA link, and instructs the memory component to transition from an active transfer power state to a sleep state, in which DC current sources are shut off, clock trees are disabled, and the only power dissipated by the device is junction leakage. In this sleep state, a small amount of CMOS logic will be listening to the CA link, and when a six-byte read or write command is directed to the device, the CMOS logic will wake up and start the access and associated calibration processes.

Figure 7B:
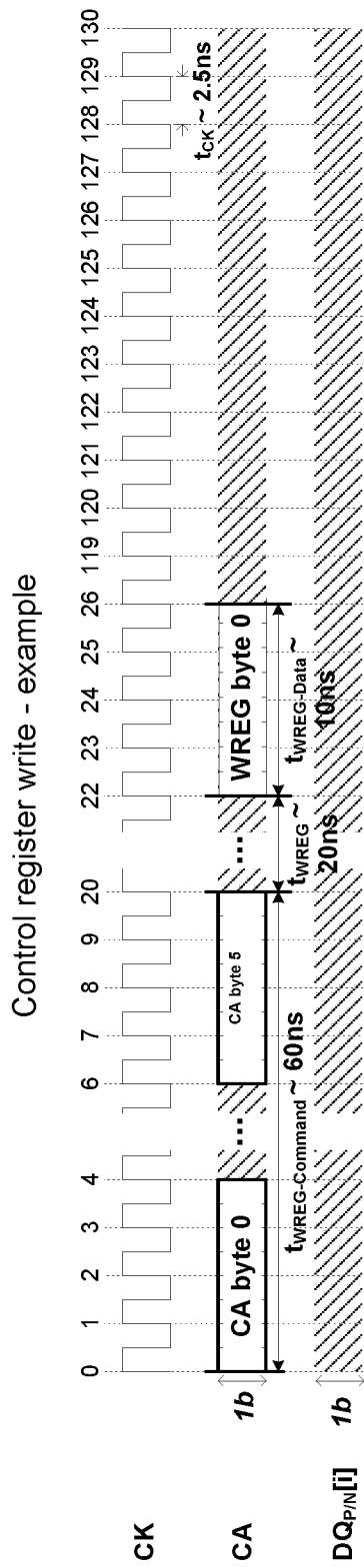
FIG. 7B illustrates a timing diagram for a control-register-write transaction.
Figure 7C:
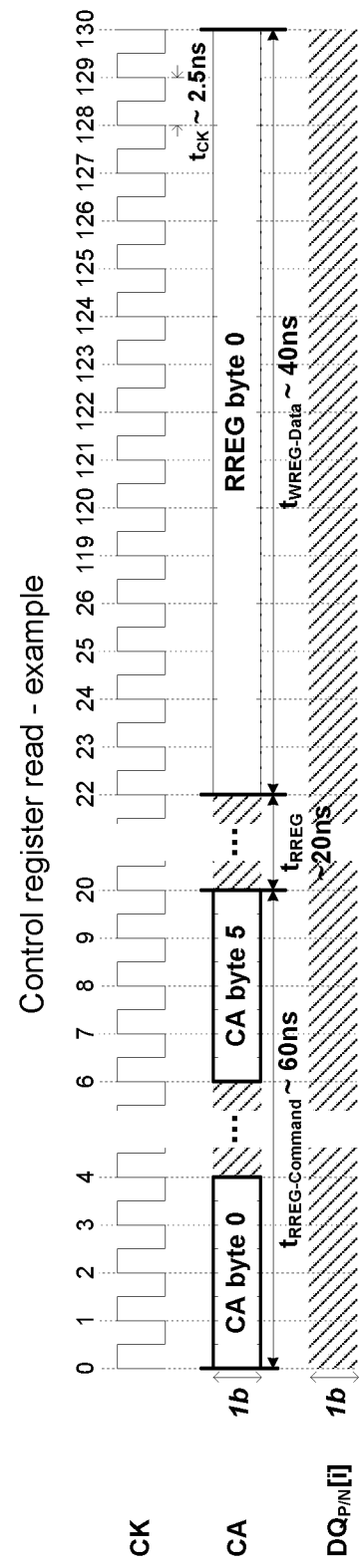
FIG. 7C illustrates a timing diagram for a control-register-read transaction.

FIG. 7B presents a timing diagram for an exemplary control-register-write transaction for the system illustrated in FIG. 2. This control-register-write transaction is used to communicate configuration and control information from memory controller 202 to flash memory device 204. As can be seen in FIG. 7B, the control-register-write transaction starts with memory controller 202 sending a six-byte control-register-write command on the CA link, which requires about 60 ns. Next, the control register on flash memory device 204 is prepared to receive the data to be written. Finally, memory controller 202 sends a single byte to be written to the control register across the CA link, which requires about 10 ns. This control-register-write operation does not involve the high-speed, low-swing DQ link, but instead uses the slower large-swing CA link to transfer the write data. Hence, this control-register-write operation provides a simple method for transferring information into the control logic of the memory component without using a calibrated link FIG. 7C presents a timing diagram for an exemplary control-register-read transaction for the system illustrated in FIG. 2. This control-register-read transaction is used to communicate status and control information from flash memory device 204 to memory controller 202. As can be seen from FIG. 7C, the control-register-read transaction starts with memory controller 202 sending a six-byte control-register-read command across the CA link, which requires about 60 ns. Next, it takes about 20 ns to prepare the control register on flash memory device 204 to send the read data. Finally, flash memory device 204 sends four bytes from the control register to memory controller 202 across the CA link, which requires about 40 ns. Like the control-register-write operation, the control-register-read operation does not use the high-speed, low-swing DQ link, but instead uses the slower large-swing CA link to transfer the read data.

Alternatively, the control register read operation could be carried out at the same bit rate as the control register write operation (1.25 ns per bit instead of 5.0 ns as shown). This would require calibrating the receiver in the controller so it correctly samples in the middle of each bit time, compensating for the round trip of the clock to the memory device and the read data back to the controller. By running slower, as shown, the calibration could be avoided (this depends upon the length of the multi-drop bus). A single receiver design could accommodate both signaling rates.

Asymmetric Interface with Bit-Rate Clock Signal

Figure 8:
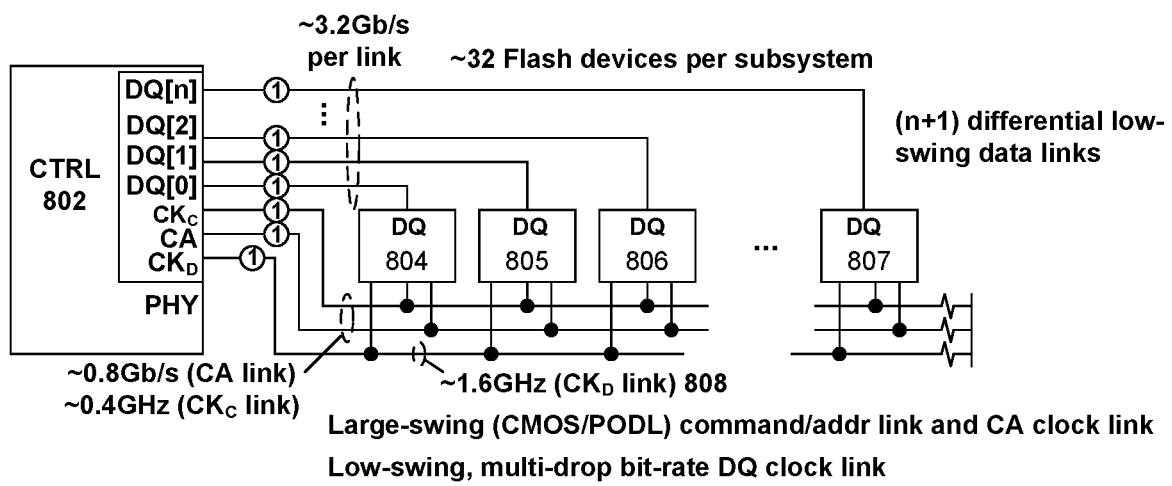
FIG. 8 illustrates another embodiment for a memory system with a shared, large-swing command/address link and point-to-point low-swing data links.

FIG. 8 illustrates another embodiment of the memory system, which is similar to the embodiment illustrated in FIG. 2, except that it includes a low-swing, multi-drop bit-rate clock link 808. In this embodiment clock link 808 carries a bit-rate clock signal with a frequency of about 1.6 GHz. This bit-rate clock signal provides a frequency/phase reference for the DQ link, which can facilitate eliminating the need for a PLL or a DLL on memory controller 802 or on flash memory devices 804-807. One motivation to eliminate the PLL/DLL in the memory device is to reduce circuit complexity. Circuit complexity can be reduced because less circuitry is required on a memory device that has to run at the maximum clock rate when there is a bit-rate clock.

Figure 9:
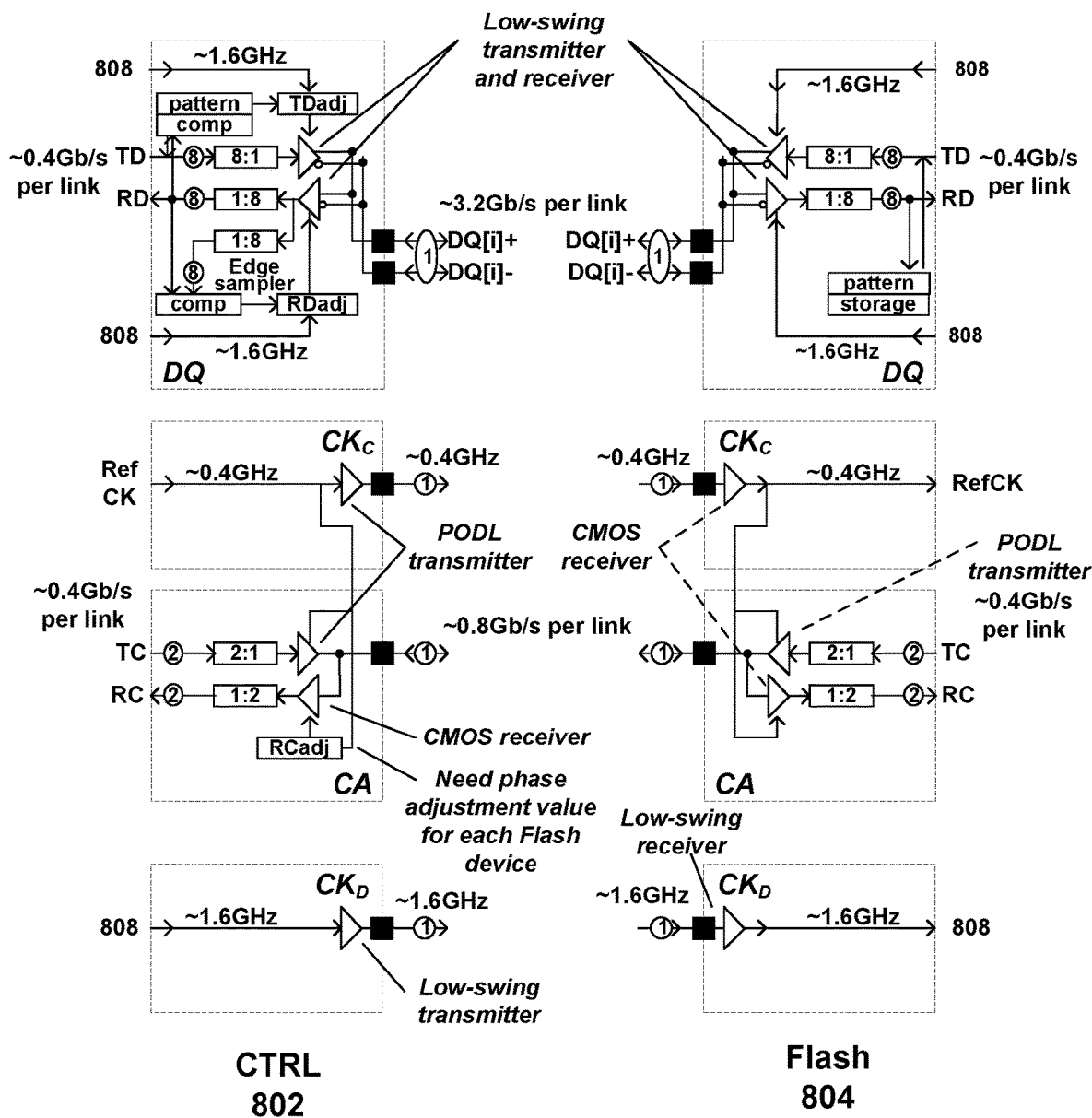
FIG. 9 illustrates corresponding interface circuitry within the controller and flash memory device.

FIG. 9 illustrates associated interface circuitry within the memory controller (CTRL) 802 and flash memory device (FLASH) 804. This interface circuitry includes transmitters and receivers for a high-performance, low-swing DQ link between memory controller 802 and flash memory device 804. This DQ circuitry does not include a PLL or a DLL at memory controller 802 or at flash memory device 804. Instead, memory controller 802 and flash memory device 804 use a low-swing, multi-drop bit-rate clock link 808 as a timing reference. This low-swing clock signal is sent from a low-swing transmitter 810 on memory controller 802 to a receiver on flash memory device 804 (see bottom of FIG. 9).

Alternatively, instead of sending a 1.6 GHz bit rate clock CKD, a second half bit rate clock running at 0.8 GHz could be sent. This second CKD clock would be shifted 90 degrees with respect to the 0.8 GHz CKC (this is also known as a "quadrature relationship"). CKD can also be a large swing signal, like CKC. The two clocks provide enough timing events to transmit and receive bits on the DQ link at the full 3.2 GHb/s rate. It is also easier to distribute the two slower clocks on the bus and inside the memory device. The transmit and receive phase adjustment values used in the controller for a particular DQ[i] link could include an offset phase between adjacent bits to account for skew between the two clock signals. For example, if the CKC and CKD signals had edges at 0, and 180 degrees and 70 and 250 degrees (20 degrees of skew) at memory device[i], then the sampling times would include the skew for alternate bits: 1, 70, 180, 250, 1, 70, 180, 250, 1, 70, 180, 250, etc.

The DQ circuitry at memory controller 802 also includes phase-adjustment values to calibrate the timing for communications across the ~3.2 Gb/s link, as well as comparators which are used during the calibration process. In this embodiment, the DQ circuitry on flash memory device 804 does not include such comparators or phase-adjustment values, since the timing calibration operations for transmit timing adjustment and receive timing adjustment are performed on the controller. Instead, the DQ circuitry on flash memory device 804 includes storage for test patterns, which is used during the calibration process.

Alternatively, logic for performing pattern-generation and pattern-checking could be used instead of the pattern storage element shown in FIG. 9. The control register read path is also available as a sideband link for returning pattern comparison results to the controller during calibration.

The interface circuitry also includes a transmitter on memory controller 802 and a receiver on flash memory device 804 for the ~0.4 GHz reference clock signal which is transmitted from memory controller 802 to flash memory device 804.

The interface circuitry additionally includes transmitters and receivers for the low-performance, large-swing CA link between memory controller 802 and flash memory device 804. This CA circuitry on memory controller 802 provides a separate phase-adjustment value for each flash memory device, which enables the CA link to have a different calibration for each flash memory device.

Figure 10:
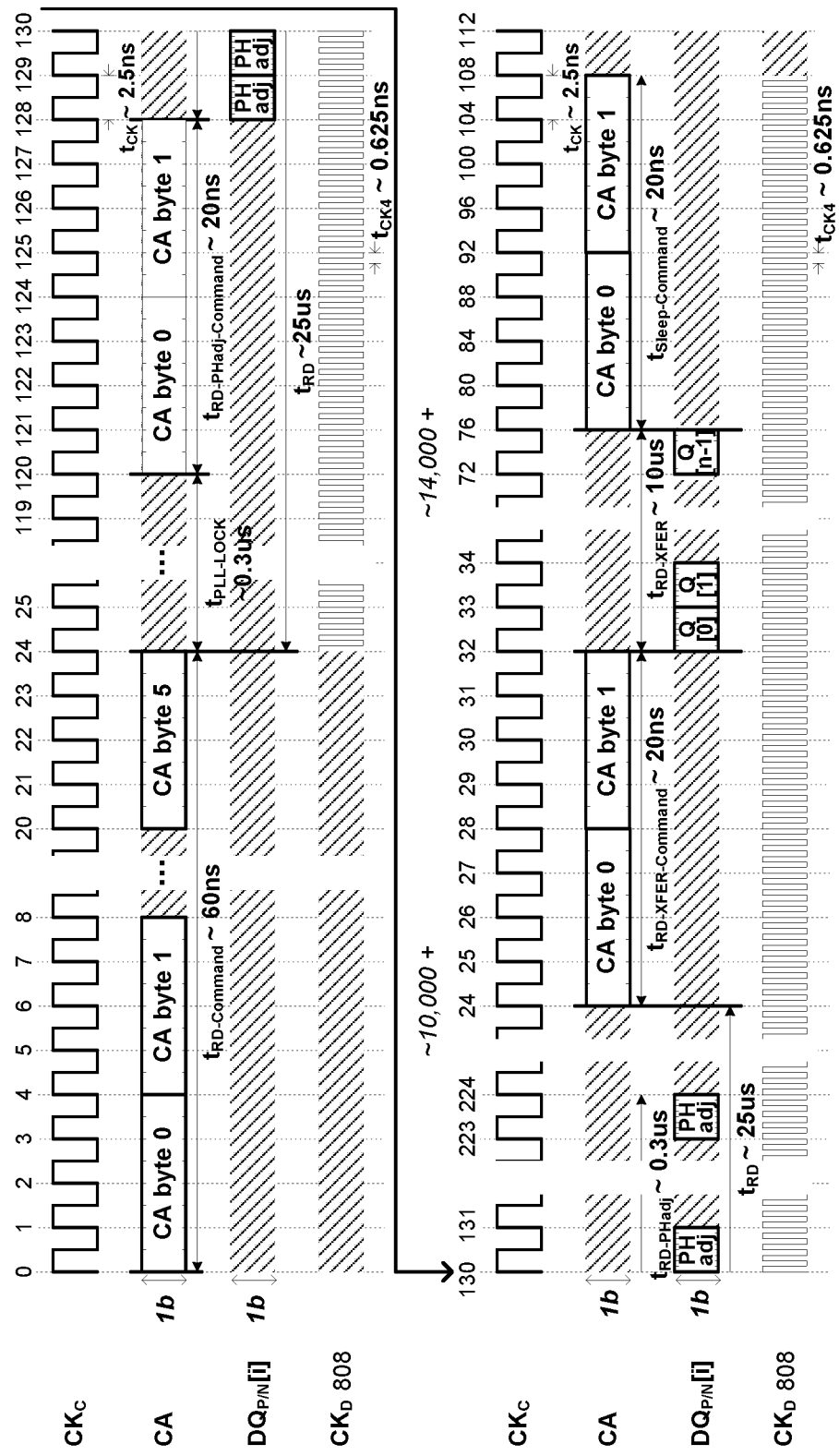
FIG. 10 illustrates a timing diagram for a read transaction.

FIG. 10 presents a timing diagram for an exemplary read transaction for the system illustrated in FIG. 8. In comparison to the timing diagram in FIG. 4, the timing diagram for the read transaction presented in FIG. 8 is the same with the exception that there exists an additional low-swing clock signal 808 with a frequency of about 1.6 GHz. This low-swing clock signal 808 can be enabled (powered up) after the six-byte read command is received on the CA link and can be disabled (powered down) after the sleep signal is transmitted on the CA link at the end of the read transaction. This selective enablement can save a significant amount of power because the point-to-point DQ link is likely to be idle for significant periods of time.

As mentioned previously, this low-swing clock signal provides a timing reference for communications across the low-swing DQ link. Hence, it is unnecessary for this low-swing clock signal to be active when memory transactions are not taking place. However, this low-swing clock signal 808 can remain active to serve as a timing reference for other memory transactions associated with other flash memory devices.

Figure 11:
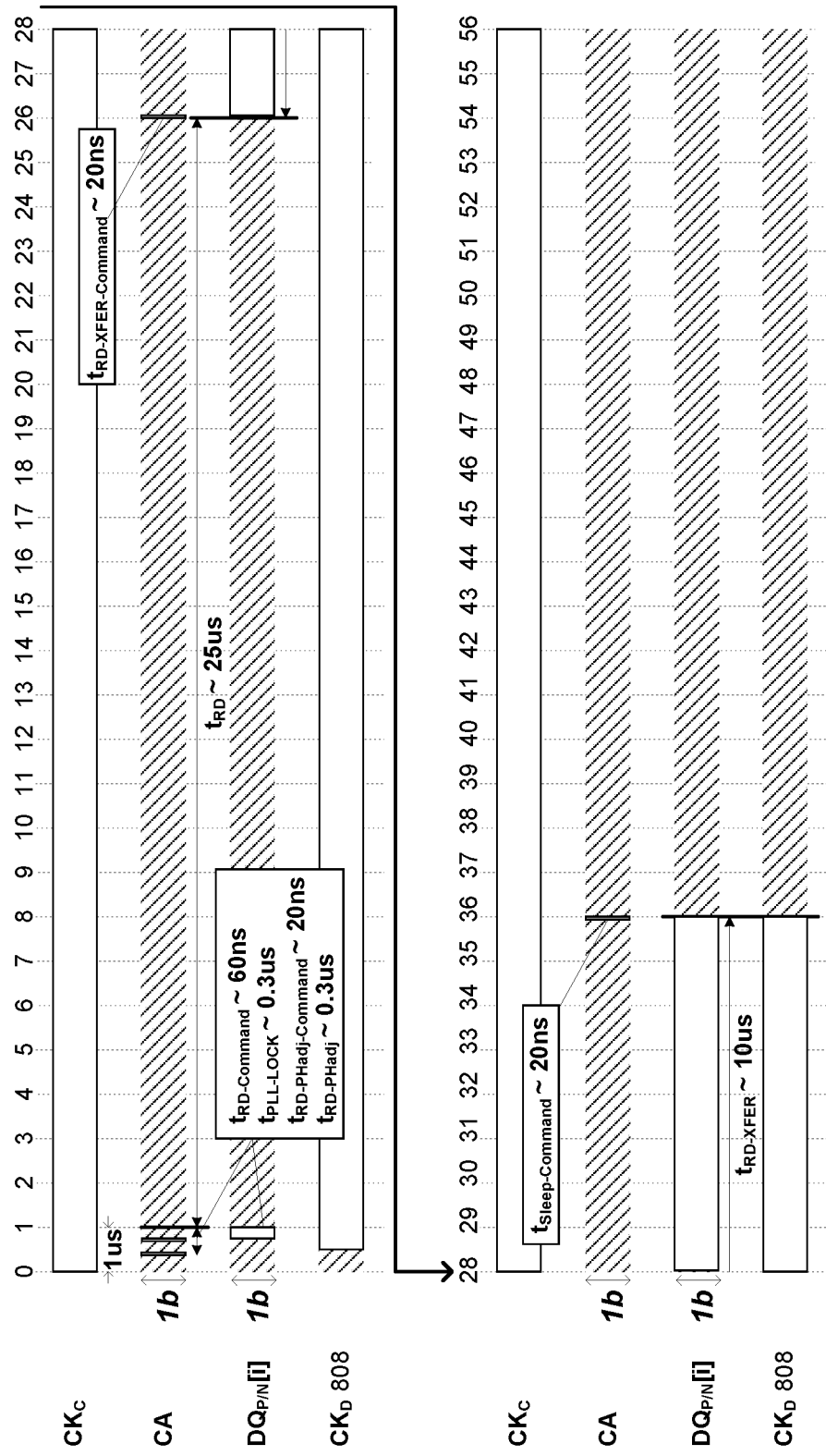
FIG. 11 illustrates a timing diagram for a read transaction with a continuous time scale.

FIG. 11 illustrates the same exemplary read transaction on a continuous time scale. As was discussed above, the low-swing clock signal can be enabled after the six-byte read command is received on the CA link and can be disabled after the sleep signal is transmitted on the CA link at the end of the read transaction.

Figure 12:
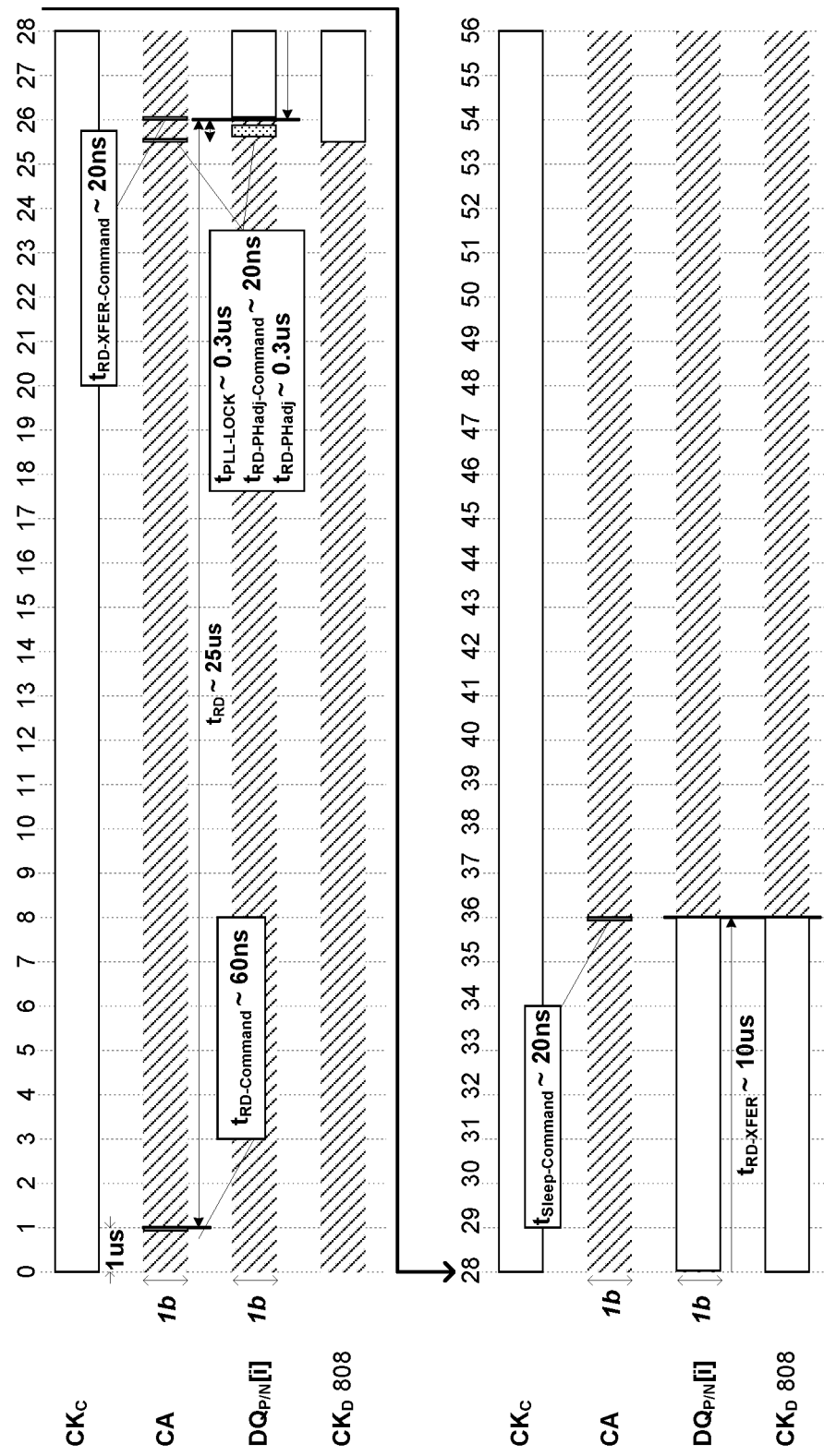
FIG. 12 illustrates a timing diagram for a read transaction with an alternative phase-adjustment sequence.

FIG. 12 presents a timing diagram for a read transaction with an alternative phase-adjustment sequence. During this alternative phase-adjustment sequence, the PLL locking and the phase-adjustment operations take place near the end of the 25 μs interval required for the read data to be retrieved internally within flash memory device 804 (instead of before the 25 μs interval starts). During this alternative phase-adjustment sequence, the low-swing clock signal 808 needs to be enabled for a smaller time interval. More specifically, the low-swing clock signal 808 only needs to be enabled for the 10 μs required to transmit the data from the flash memory device 804 to memory controller 802, instead of having to be additionally enabled during the 25 μs required to retrieve the read data internally within the flash memory device 804.

Figure 13A:
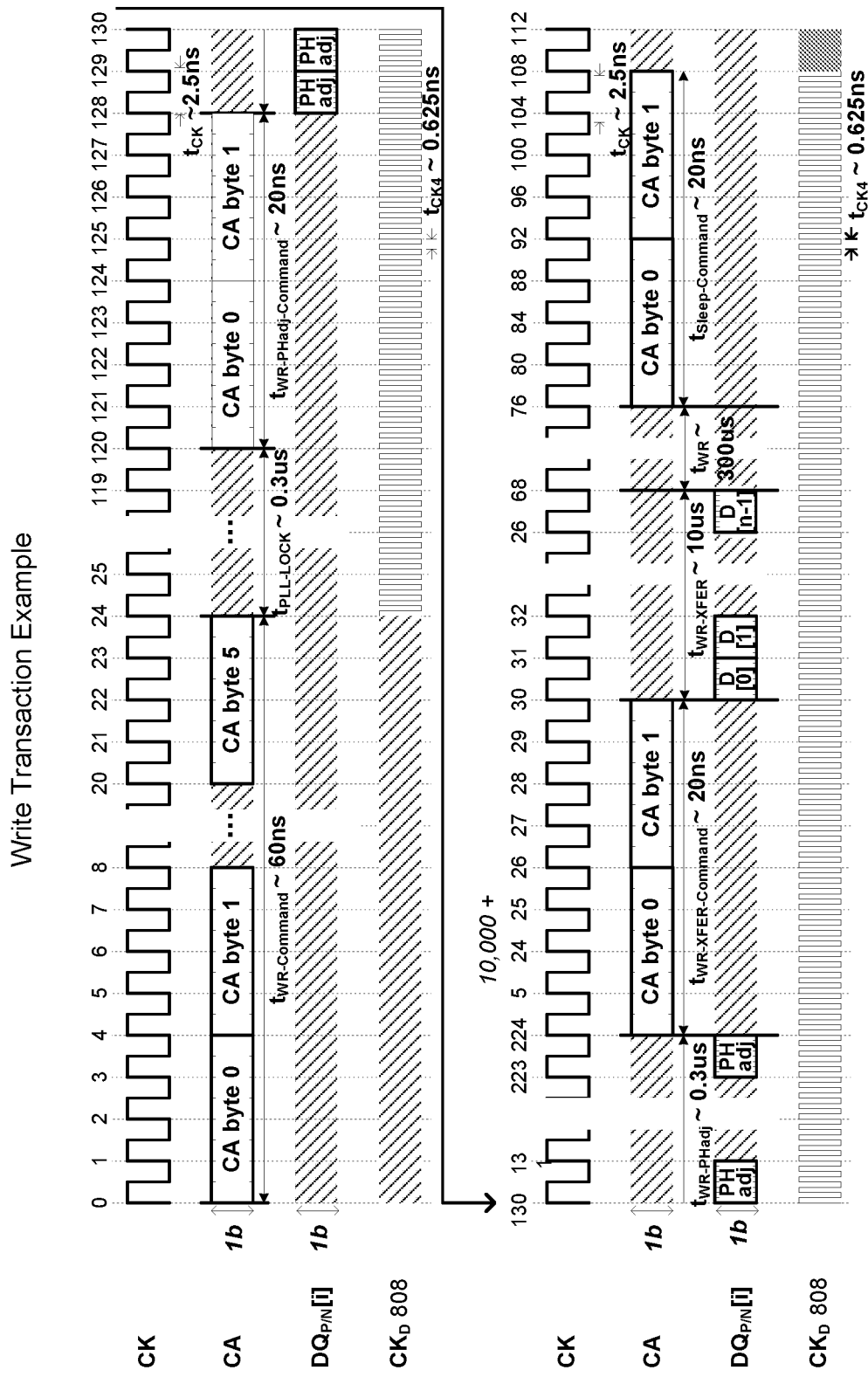
FIG. 13A illustrates a timing diagram for a write transaction.

FIG. 13A presents a timing diagram for an exemplary write transaction for the system illustrated in FIG. 8. The timing diagram for this write transaction is the same as the timing diagram which appears in FIG. 7A, except that there exists an additional low-swing clock signal 808 with a frequency of about 1.6 GHz, which can be enabled after the six-byte read command is received on the CA link and can be disabled after the sleep signal is transmitted on the CA link at the end of the read transaction.

Figure 13B:
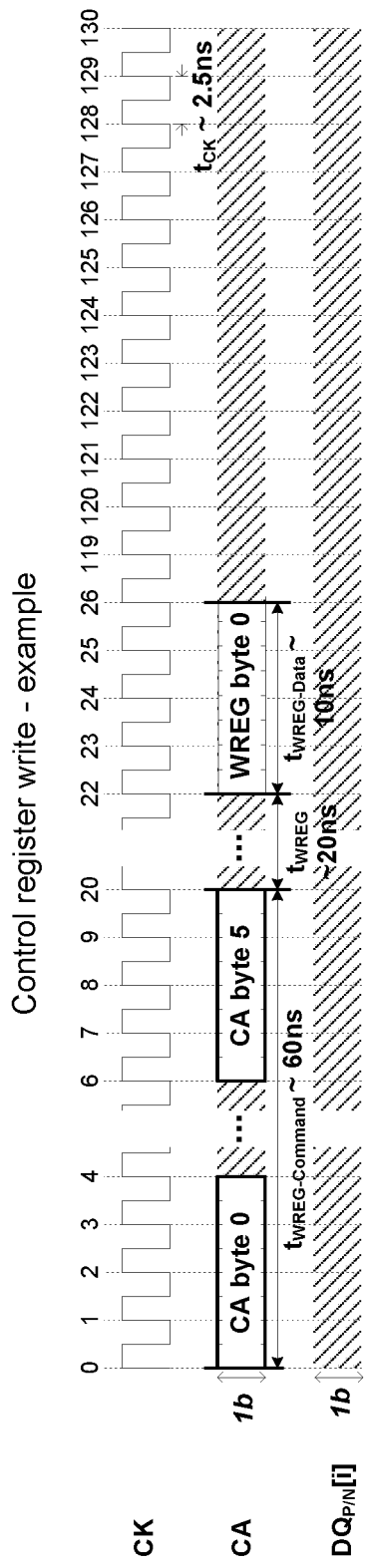
FIG. 13B illustrates a timing diagram for a control-register-write transaction.
Figure 13C:
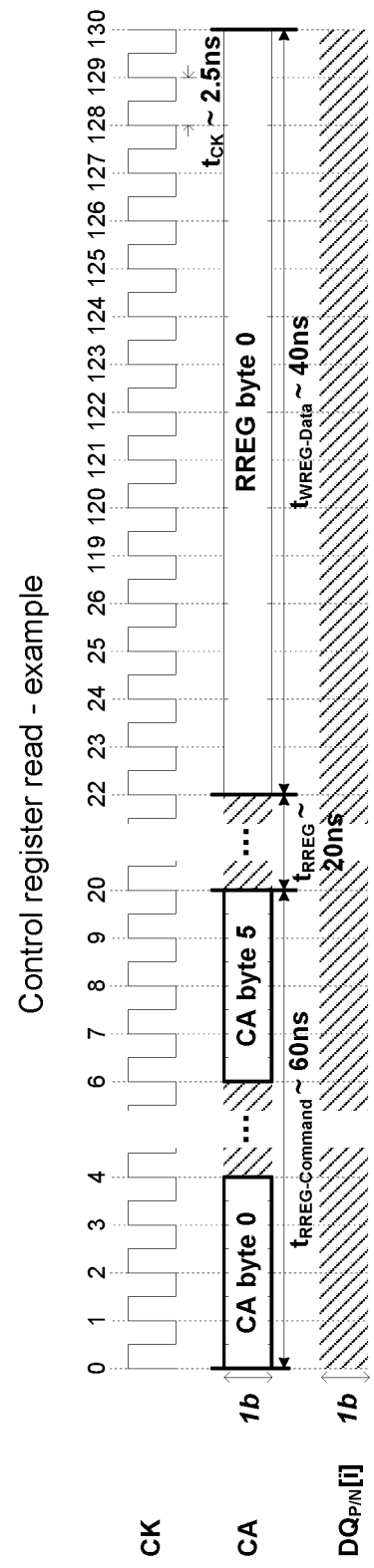
FIG. 13C illustrates a timing diagram for a control-register-read transaction.

FIGS. 13B and 13C present timing diagrams for exemplary control-register-write and control-register-read transactions for the system illustrated in FIG. 8. These control-register transactions transfer only a small amount of data and do not involve high-speed communications across the DQ link. Hence, these control-register transactions do not make use of low-swing clock signal 808 as a timing reference, and as a consequence, the timing diagrams in FIGS. 13B and 13C are identical to the timing diagrams in FIGS. 7B and 7C (which similarly do not use a low-swing clock signal).

Interface Using Bimodal Signaling for Command/Data Information

Figure 14:
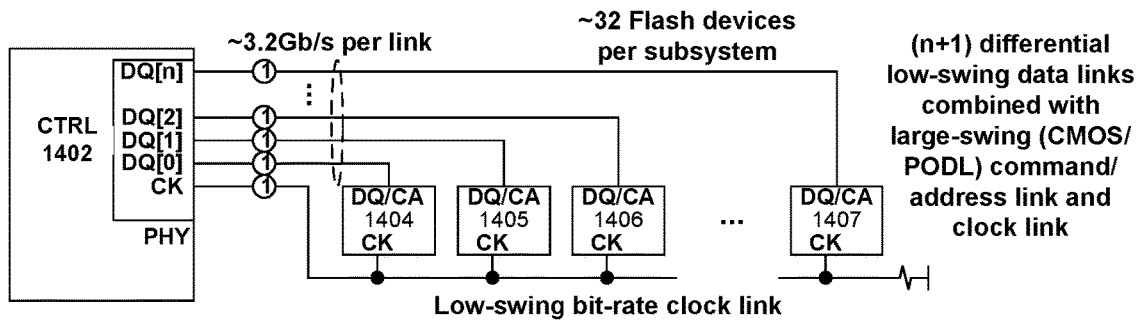
FIG. 14 illustrates another embodiment of a memory system with a shared, large-swing command/address link and point-to-point low-swing data links.

FIG. 14 illustrates another embodiment of the memory system which is similar to the embodiment illustrated in FIG. 2, except that there exists no CA link. Instead, the low-speed command/address information is interleaved with high-speed data transfers on the individual DQ links. Hence, each DQ link can carry both low-swing data signals at 3.2 GHz and large-swing command/address signals at 0.4 GHz.

Figure 15:
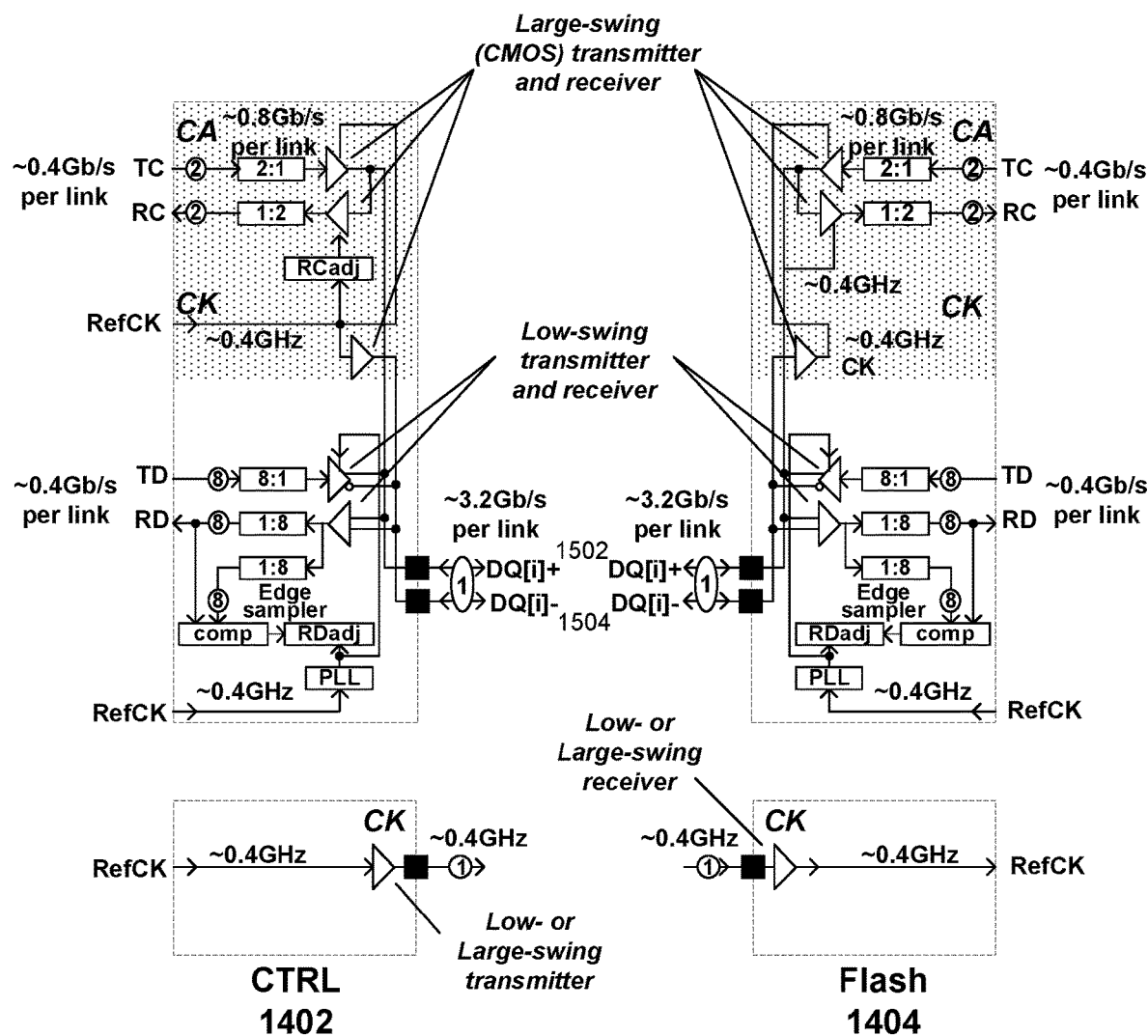
FIG. 15 illustrates corresponding interface circuitry within the controller and flash memory device.

FIG. 15 illustrates associated interface circuitry within the memory controller (CTRL) 1402 and flash memory device (FLASH) 1404. This interface circuitry is configured to transmit both low-swing, high-speed data signals and large-swing, lower-speed command/address signals on the same DQ link. Hence, each DQ link is coupled to transmitters and receivers for both low-swing signals and large-swing signals. More specifically, each DQ link is coupled to transmitters and receivers for high-performance, low-swing data signals between memory controller 1402 and flash memory device 1404. This high-speed data-transmission circuitry includes a PLL at the memory controller 1402 and a PLL at the flash memory device 1404, which generate a timing reference for a ~3.2 Gb/s link based on a ~0.4 GHz reference clock. This data-transmission circuitry also includes phase-adjustment values to calibrate the timing for the communications across the ~3.2 Gb/s link, as well as comparators which are used during the calibration process.

Each DQ link is additionally coupled to transmitters and receivers for the low-performance, large-swing CA signals between memory controller 1402 and flash memory device 1404. This CA circuitry in memory controller 1402 includes a separate phase-adjustment value for each flash memory device, which enables the CA link to provide a different calibration for each individual flash memory device.

Both the high-speed, low-swing transmitters and receivers and the low-speed, large swing transmitters and receivers are coupled to the same bidirectional DQ links 1502.

This interface circuitry also includes a transmitter on memory controller 1402 and a receiver on flash memory device 1404 for the ~0.4 GHz reference clock signal which is transmitted from memory controller 1402 to flash memory device 1404.

Figure 16:
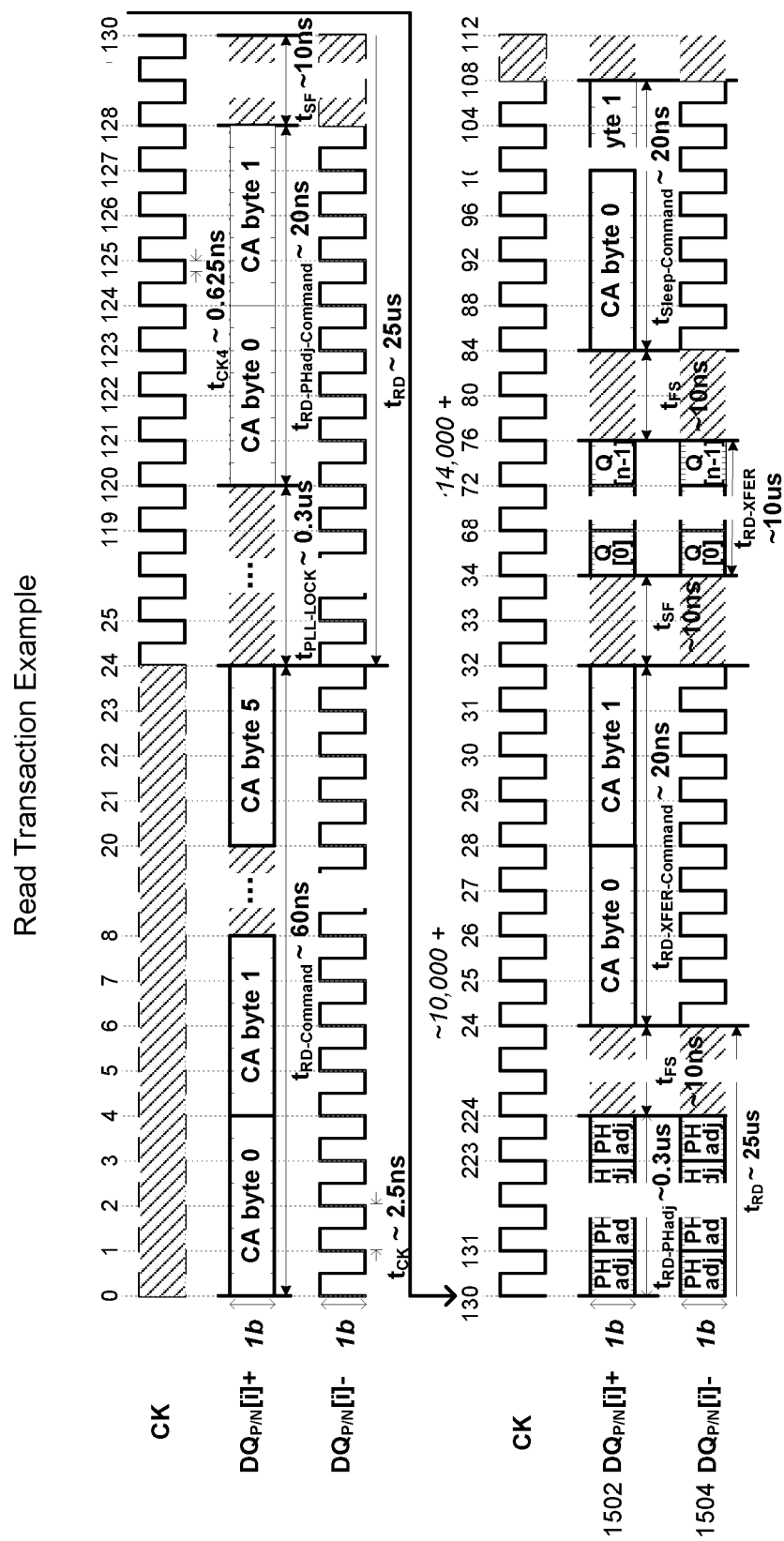
FIG. 16 illustrates a timing diagram for a read transaction.
Figure 17A:
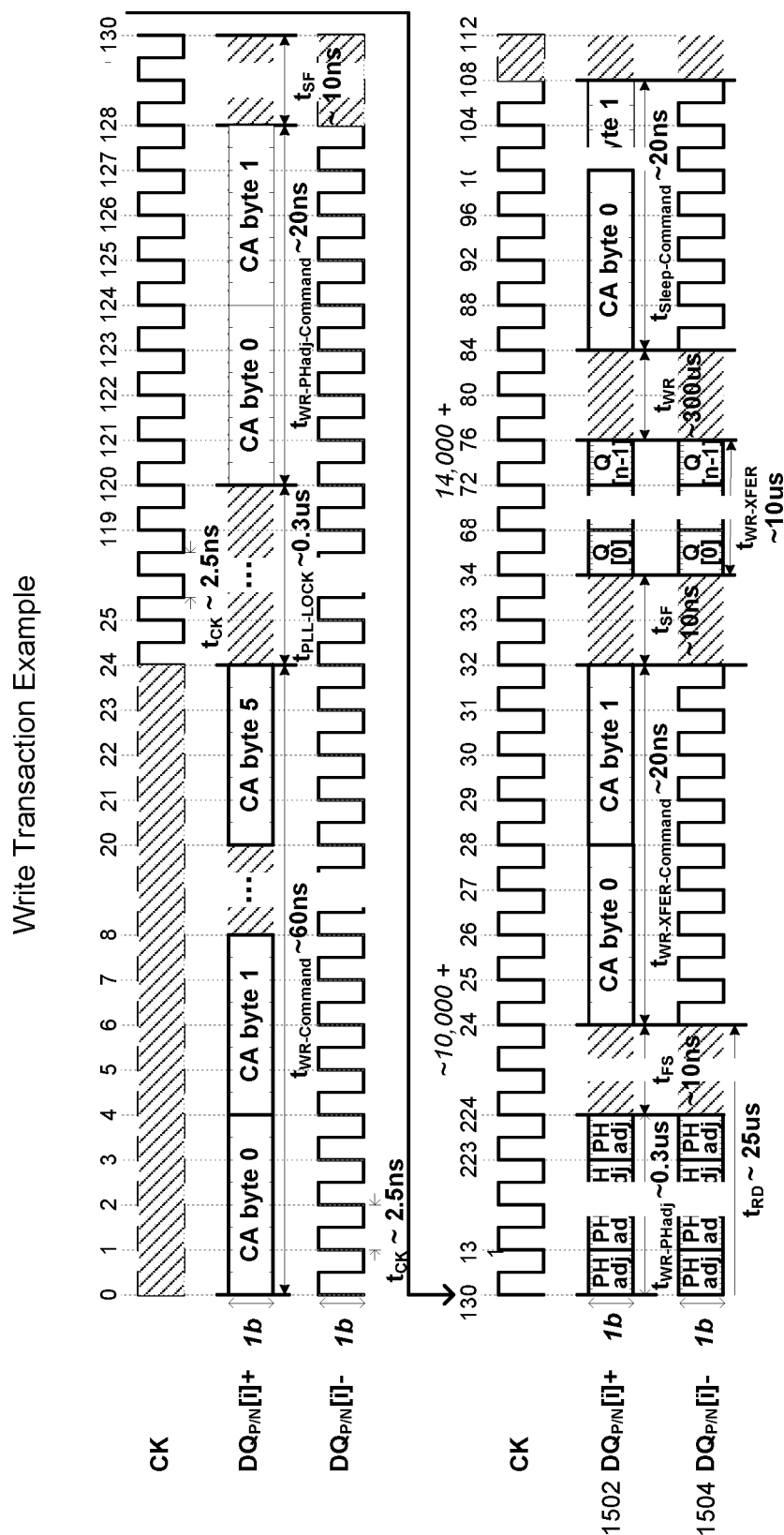
FIG. 17A illustrates a timing diagram for a write transaction.

FIGS. 16 and 17A present timing diagrams for exemplary read and write transactions for the system illustrated in FIG. 14. The timing diagram for the read transaction is the same as the timing diagram which appears in FIG. 4, except that the CA signal and the DQ signal are interleaved and transmitted across the same two conductors $DQ_{P/N}[i]+$ 1502 and $DQ_{P/N}[i]-$ 1504. During high-speed, low-swing data transfers, the two conductors function as a differential pair, which carries complementary positive and negative signals. In contrast, during low-speed, large-swing data transfers, one of the conductors $DQ_{P/N}[i]-$ 1504 provides a low-speed timing reference signal for command/address information which is transmitted on the other conductor $DQ_{P/N}[i]+$ 1502.

FIGS. 17B and 17C present timing diagrams for exemplary control-register-write and control-register-read transactions for the system illustrated in FIG. 14. These timing diagrams are similar to the timing diagrams illustrated in FIGS. 7B and 7c, except that the system uses the two conductors which comprise the DQ link to perform the transactions, instead of the CA and CK links. More specifically, the $DQ_{P/N}[i]+$ link 1502 is used to transfer commands and associated data instead of the CA link, and the $DQ_{P/N}[i]-$ link 1504 is used to provide a low-speed timing reference signal instead of the CK link.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments.

Moreover, embodiments of one or more of these circuits, integrated circuits, devices, systems and/or techniques may be used in memory systems and/or memory devices that include different types of memory, such as: volatile memory, non-volatile memory, erasable programmable read-only memory (EPROM), electrically erasable programmable read-only memory (EEPROM), NAND or NOR Flash, a fully buffered NAND Flash memory module, solid-state memory, resistance-change memory (such as RRAM), phase-change memory (PCM), and/or another type of memory. Moreover, for a given type of memory, these techniques may be used in different memory technologies or technology generations (which may use different power supply voltages).

Additionally, the systems described above can be implemented as a non-volatile memory solution for a solid-state disk system. Such a system can be used as a drop-in replacement for hard disk drives to store files, or other types of secondary store devices.

Hence, embodiments of one or more of these circuits can be used to provide random-access memory or non-volatile secondary storage in a computing device, which can generally include any type of computing device, including, but not limited to, a computer system based on a microprocessor, a mainframe computer, a digital signal processor, a portable computing device, a personal organizer, a cell phone, a device controller, or a computational engine within an appliance.

The term "flash memory" as used in this disclosure is intended to refer any one of a number of exemplary technologies from a large set of high-capacity memory technologies. This set is characterized by large block transfers because of the need to reduce the access time overhead, which results in a large imbalance in the DQ/RQ information per transaction. Many of these high-capacity memory technologies are non-volatile.

The foregoing descriptions of embodiments have been presented for purposes of illustration and description only. They are not intended to be exhaustive or to limit the present description to the forms disclosed. Thus, the present embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

What is claimed is:

1. A method for controlling a non-volatile integrated circuit (IC) memory device by a memory controller, the method comprising:
   sending a read command from the memory controller to the non-volatile IC memory device to access read data from storage during an access time interval, the access time interval representing a time to access the read data corresponding to the read command;
   after sending the read command, sending to the non-volatile IC memory device a calibration command that specifies performing a read timing-calibration operation associated with the read command, the read timing-calibration operation to adjust a first receive timing phase relationship between read data received at the memory controller and a receive timing reference to an adjusted receive phase relationship, the read-timing calibration operation performed during the access time interval; and
   receiving the read data from the non-volatile IC memory device in accordance with the adjusted receive phase relationship.

2. The method according to claim 1 wherein the access time interval comprises a time interval to access data in the storage in response to the read command.

3. The method according to claim 1 wherein the timing calibration operation is completed during the access time interval.

4. The method of claim 1, further comprising:
   enabling a current source of a transmitter disposed on the non-volatile IC memory device such that receiving the data includes transmitting the data from the non-volatile IC memory device using the transmitter, and wherein the enabling of the current source and the transmitting of the data are triggered at the non-volatile IC memory device in response to the read command.

5. The method of claim 1,
   wherein the read command is sent through a first link between the memory controller and the non-volatile IC memory device; and
   wherein the read data is transferred from the non-volatile IC memory device to the memory controller via a second link.

6. The method of claim 5,
   wherein sending the read command to the non-volatile IC memory device through the first link involves sending the read command through a multi-drop link which couples the memory controller to multiple non-volatile IC memory devices; and
   wherein performing the data transfer through the second link involves sending the data though a point-to-point link which couples the memory controller to a single non-volatile IC memory device.

7. The method of claim 5, wherein the timing-calibration operation involves:
   locking a locked loop which provides the read timing reference for communications on the second link; and/or
   calibrating a phase relationship between a clock signal generated based on the timing reference and a data signal on the second link.

8. The method of claim 1, wherein the timing-calibration operation involves multiple phase comparisons at different phase offsets which vary by at least one transmit bit (tBIT) time.

9. The method of claim 8, wherein the timing-calibration operation involves:
   setting a phase offset for the timing-calibration to a minimum possible value; and
   sweeping through an entire phase range and noting a fail-pass point and a pass-fail point for a data link between the memory controller and the non-volatile IC memory device;
   wherein the entire phase range includes multiple tBIT times.

10. A memory controller, comprising:
    a first interface to communicate read commands from the memory controller to a non-volatile integrated circuit (IC) memory device to access read data from storage during an access time interval, the access time interval representing a time to access the read data corresponding to the read command;
    a second interface to receive read data associated with the read commands between the memory controller and the non-volatile IC memory device;
    wherein after sending a read command, the memory controller is to:
        send to the non-volatile IC memory device a command that specifies performing a read timing-calibration operation through the first interface, the read timing-calibration operation to adjust a receive timing phase relationship between read data received at the memory controller and a read timing reference, the read timing-calibration operation performed during the access time interval and
        receive read data associated with the read command through the second interface in accordance with the adjusted receive timing phase relationship.

11. The memory controller of claim 10, further comprising a bit-rate clock interface for a multi-drop link which provides a bit-rate clock signal from the memory controller to multiple non-volatile IC memory devices, wherein the bit-rate clock signal provides a frequency/phase reference for the second interface.

12. The memory controller of claim 10, wherein the first interface and the second interface share a common communication channel between the memory controller and the non-volatile IC memory device.

13. The memory controller of claim 10, wherein the timing-calibration operation involves multiple phase comparisons at different phase offsets which vary by at least one transmit bit (tBIT) time.

14. A method for controlling a non-volatile integrated circuit (IC) memory device by a memory controller, the method comprising:
    dispatching a read command from the memory controller to the non-volatile IC memory device to access read data from storage during an access time interval, the access time interval representing a time to access the read data corresponding to the read command;

sending to the non-volatile IC memory device a command that specifies adjusting a receive timing phase relationship between read data received at the memory controller and a receive timing reference, the adjusting a receive timing phase relationship performed during the access time interval; and receiving the read data from the non-volatile IC memory device in accordance with the adjusted receive timing phase relationship.

15. The method according to claim 14 wherein the access time interval comprises a time interval to access data in the storage in response to the read command.

16. The method according to claim 14 wherein the adjusting is completed during the access time interval.

17. The method of claim 14, further comprising:

enabling a current source of a transmitter disposed on the non-volatile IC memory device such that receiving the data includes transmitting the data from the non-volatile IC memory device using the transmitter, and wherein the enabling of the current source and the transmitting of the data are triggered at the non-volatile IC memory device in response to the read command.

18. The method of claim 14, wherein the read command is sent through a first link between the memory controller and the non-volatile IC memory device; and wherein the read data is transferred from the non-volatile IC memory device to the memory controller via a second link.

19. The method of claim 18, wherein sending the read command to the non-volatile integrated circuit memory device through the first link involves sending the read command through a multi-drop link which couples the memory controller to multiple non-volatile IC memory devices; and wherein receiving the read data through the second link involves sending the data though a point-to-point link which couples the memory controller to a single non-volatile IC memory device.

20. The method of claim 18, wherein the adjusting involves:

locking a locked loop which provides the read timing reference for communications on the second link; and/or calibrating a phase relationship between a clock signal generated based on the timing reference and a data signal on the second link.

* * * * *